United States Patent [19]

Birkett et al.

[11] 4,067,865
[45] Jan. 10, 1978

[54] WATER-SOLUBLE DIAZOTIZED AMINO AZO DYESTUFF COUPLED WITH AN AMINO-PHENYL OR -NAPHTHYL COMPONENT

[75] Inventors: Kevin Lawson Birkett; John Alexander Bone; Denis Robert Annesley Ridyard, all of Manchester, England

[73] Assignee: Imperial Chemical Industries Limited, London, England

[21] Appl. No.: 747,313

[22] Filed: Dec. 3, 1976

Related U.S. Application Data

[63] Continuation of Ser. No. 505,945, Sept. 13, 1974, abandoned.

[30] Foreign Application Priority Data

Sept. 26, 1973   United Kingdom .............. 45087/73

[51] Int. Cl.$^2$ .................... C09B 31/04; C09B 31/06; C09B 31/08
[52] U.S. Cl. .................... 260/187; 260/190; 260/191; 260/196
[58] Field of Search .............. 260/174, 185, 187, 177, 260/184, 190, 191

[56] References Cited

U.S. PATENT DOCUMENTS

| | | | |
|---|---|---|---|
| 605,103 | 6/1898 | Kahn et al. | 260/190 |
| 2,092,076 | 9/1937 | Knight | 260/191 |
| 2,120,754 | 7/1938 | Krebser | 260/190 |
| 2,124,688 | 7/1938 | Daudt et al. | 260/191 |
| 2,172,752 | 9/1939 | Kvalnes | 260/187 X |
| 2,244,339 | 6/1941 | Kvalnes | 260/191 |
| 2,257,694 | 9/1941 | Krebser | 260/190 X |
| 3,096,140 | 7/1963 | Gaetani | 260/187 X |
| 3,932,379 | 1/1976 | Brulard | 260/184 X |

OTHER PUBLICATIONS

*Colour Index*, 3rd Ed., vol. 4, 1971. p. 4236 (C.I. 26705), p. 4242 (C.I. Nos. 27065, 27066, 27070, 27075), & p. 4246 (C.I. 27230 & C.I. 27235).

*Primary Examiner*—Charles F. Warren
*Attorney, Agent, or Firm*—Cushman, Darby & Cushman

[57] ABSTRACT

Water-soluble azo dye which, in the form of the free acid, has the formula

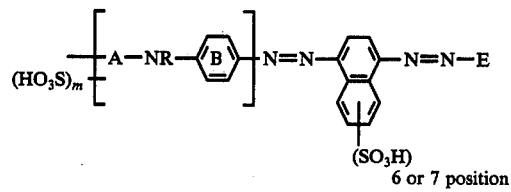

wherein A represents lower alkyl, hydroxy lower alkyl or phenyl and R represents hydrogen, lower alkyl or hydroxy lower alkyl and A, when phenyl, and ring B is unsubstituted or substituted by nitro, alkyl or alkoxy, $m$ has a value of 0 or 1 and E represents a residue selected from:

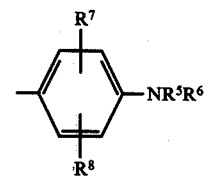

wherein $R^5$ represents hydrogen, lower alkyl, hydroxy lower alkyl or benzyl, $R^6$ represents lower alkyl or hydroxy lower alkyl and $R^7$ and $R^8$ each independently represent hydrogen, lower alkyl, lower alkoxy or acetylamino; and

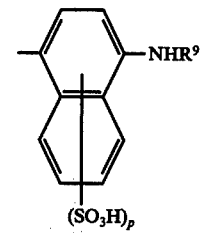

wherein $R^9$ represents lower alkyl, hydroxy lower alkyl, sulphato lower alkyl, phenyl or phenyl substituted by lower alkyl, lower alkoxy or hydroxy and $p$ has a value of 0 or 1 with the proviso that there are no more than two sulpho groups in said dye. The dye is useful to color natural and synthetic polyamide textile materials.

24 Claims, No Drawings

WATER-SOLUBLE DIAZOTIZED AMINO AZO DYESTUFF COUPLED WITH AN AMINO-PHENYL OR -NAPHTHYL COMPONENT

This is a continuation, of application Ser. No. 505,945 filed Sept. 13, 1974, now abandoned.

This invention relates to disazo dyes and their application to textile materials.

According to the invention, there are provided water-soluble disazo dyes which, in the form of the free acids, have the general formula:

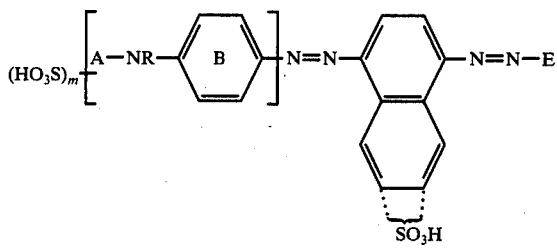

wherein A represent an alkyl or aryl of radical and R represents hydrogen or an alkyl radical such that A, when alkyl, and R may be substituted by halogen atoms or alkoxy, hydroxy or cyano groups and A, when aryl, and ring B may be substituted by halogen atoms or nitro, alkyl, alkoxy, hydroxy or acylamino groups, $m$ has a value of 0, 1 or 2 and E represents a residue selected from:

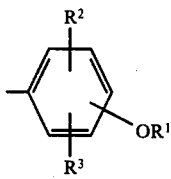

(i)

wherein $R^1$ represents hydrogen or akyl, the —$OR^1$ group being in an ortho or para position relative to the azo group, and $R^2$ and $R^3$ each independently represents hydrogen, lower alkyl, lower alkoxy or halogen;

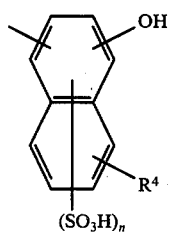

(ii)

wherein the hydroxy group is in an ortho or para position relative to the azo group, $R^4$ represents hydrogen, amino, alkylamino or arylamino and $n$ has a value of 0, 1 or 2 provided that the sum of $m$ and $n$ does not exceed 3;

(iii)

wherein $R^5$ represents hydrogen, optionally substituted alkyl or optionally substituted aryl, $R^6$ represents hydrogen or optionally substituted alkyl and $R^7$ and $R^8$ each independently represents hydrogen, lower alkyl, lower alkoxy, halogen or acylamino; and (iv)

wherein $R^9$ represents hydrogen, alkyl, acyl or aryl optionally substituted by alkyl, alkoxy, halogen, or acylamino and $p$ has a value of 0, 1 or 2 provided that the sum of $m$ and $p$ does not exceed 3.

The terms "lower akyl" and "lower alkoxy" used in this specification mean alkyl and alkoxy groups having from one to four carbon atoms.

The preferred dyes of the invention are those wherein E represents a residue of class (iv) above and especially those of the formula:

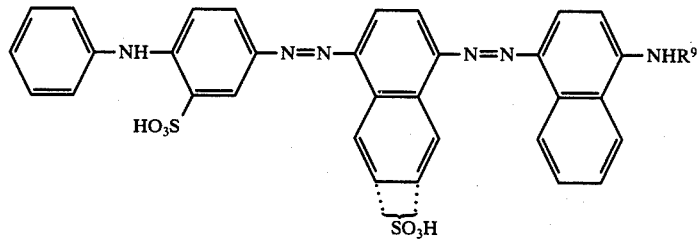

wherein $R^9$ has the meaning stated above.

The dyes of the invention may be prepared by diazotizing a primary amine of the formula:

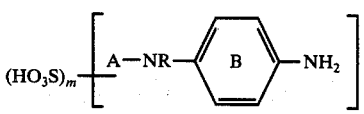

wherein A, R, B and $n$ have the significances stated above, coupling with an aminonaphthalene sulphonic acid of the formula:

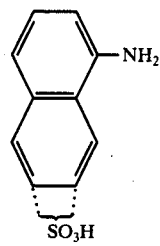

and then diazotizing the resulting aminomonoazo compound and coupling under appropriate conditions with a phenolic coupling component of the formula:

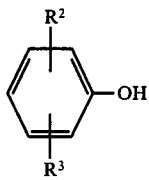
(i)

wherein $R^2$ and $R^3$ have the meanings stated above and, where desired, converting the hydroxyl group to alkoxy by a known method, or

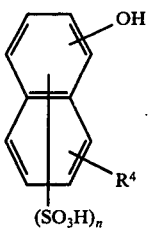
(ii)

wherein $R^4$ and $n$ have the meanings stated above, or a para-coupling aromatic amine coupling component of the formula:

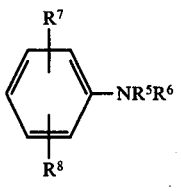
(iii)

wherein $R^5$, $R^6$, $R^7$ and $R^8$ have the meanings stated above, or

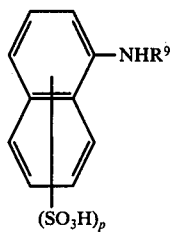
(iv)

wherein $R^9$ and $p$ have the meanings stated above.

Primary amines which may be used in the formation of the aminomonoazo compound include N,N-dimethyl-p-phenylene diamine, 4-aminodiphenylamine-2-sulphonic acid, 4-amino-2′-nitrodiphenylamine-4′-sulphonic acid and 4-amino-2′-nitrodiphenylamine-3,4′-disulphonic acid.

The coupling component used in forming the aminomonoazo compound may be 1-naphthylamine-6-sulphonic acid or 1-naphthylamine-7-sulphonic acid or a mixture of the two.

Suitable coupling components of formula (i) include phenol, m-cresol, o-cresol, p-cresol, o-chlorophenol, 2,5-dimethylphenol, 6-chloro-3-methylphenol, 3,5-dimethylphenol, 2,6-dimethylphenol, 2-methoxyphenol, 3-methoxyphenol, 4-methoxyphenol and 4-tertbutylphenol.

Suitable coupling components of formula (ii) include α-naphthol, β-naphthol, 1-naphthol-3-, 4- or 5-sulphonic acid, 1-naphthol-3,6- or 4,8-disulphonic acid, 2-naphthol-4-, 6- or 7-sulphonic acid, 2-naphthol-3,6-disulphonic acid, 2-naphthol-3,6,8-trisulphonic acid, 2-amino-5-naphthol-7-sulphonic acid, 2-methylamino-5-naphthol-7-sulphonic acid, 2-phenylamino-5-naphthol-7-sulphonic acid, 2-amino-8-naphthol-6-sulphonic acid, 2-phenylamino-8-naphthol-6-sulphonic acid, 1-amino-8-naphthol-3,6-disulphonic acid and 1-amino-8-naphthol-4,6-disulphonic acid.

Suitable coupling components of formula (iii) include aniline, N,N-dimethylaniline, N,N-diethylaniline, N-ethyl-N-hydroxyethylaniline, N,N-bis-β-hydroxyethylaniline, o-toluidine, N,N-bis-β-hydroxyethyl-m-toluidine, 2,5-xylidine, o-anisidine, cresidine and 2,5-dimethoxyaniline.

Suitable coupling components of formula (iv) include N-ethyl-α-naphthylamine, N-phenyl-α-naphthylamine, N-(4-methylphenyl)-α-naphthylamine, N-(4-methoxyphenyl)-α-naphthylamine and N-phenyl-1-naphthylamine-8-sulphonic acid.

The reactions leading to the formation of the dyes of the invention may be performed using conditions that have been fully described in the prior art for such reactions. Thus, in carrying out the coupling reactions, appropriate conditions of alkalinity or acidity are used according to whether the coupling component is a phenol or an amine. Similarly, the dyes may be isolated by known methods and as in the case of other dyes containing sulphonic acid groups it is often convenient to isolate and use the dyes in the form of their water-soluble salts, particularly their alkali metal or ammonium salts and especially sodium salts.

The dyes of the invention are particularly suitable for applying to natural or synthetic polyamide textile materials, for example wool, silk and nylon using conventional dyeing, padding or printing techniques. The polyamides may be in any textile form, for example filaments, staple, yarn or woven or knitted fabrics. The dyes give red, violet, navy and black colorations having a high degree of fastness to wet treatments and to light.

The invention is illustrated but not limited by the following Examples in which all parts are by weight.

EXAMPLE 1

5.3 parts of 4-aminodiphenylamine-2-sulphonic acid are diazotized in the usual manner, using 1.4-parts of sodium nitrite in ice-cold aqueous solution containing hydrochloric acid. The diazonium salt solution is added to an ice-cold solution of 4.5 parts of mixed 1-naphthylamine-6- and 7-sulphonic acids. After completion of coupling, the aminomonoazo dyestuff is isolated by addition of sodium chloride, dissolved in 400 parts of water by addition of sodium hydroxide solution, and diazotized by the addition, at 0°–5° C, of 10 parts of concentrated hydrochloric acid solution and 1.4 parts sodium nitrate. After 1 hour the resulting diazonium salt solution is added at 0°–5° C to a solution of 2 parts of phenol in 300 parts of water, maintaining the pH of the solution at 9–10 by the addition of sodium hydroxide solution. After completion of coupling, the disazo dyestuff is precipitated by addition of sodium chloride, collected and dried.

The product dyes polyamide fibers from a weakly-acidic dyebath, giving bluish-red shades on nylon and brown-red shades on wool of very good fastness to wet treatments and light.

Dyes of similar properties result from the replacement of the mixture of 1-naphthylamine-6- or 7-sulphonic acids by either of its components.

EXAMPLE 2

The solution of diazotized aminomonoazo dyestuff prepared as in Example 1 is added at 0°–5° C to a solution of 3.6-parts of N,N-bis-β-hydroxyethylaniliine in 200 parts of water and 15 parts of concentrated hydrochloric acid, the pH of the solution brought to 3–4 with sodium acetate solution and the solution stirred 18 hours at 0°–5° C. The disazo dyestuff is precipitated by addition of sodium chloride, washed free of acid with brine and dried.

The product dyes nylon in violet, and wool in brown-violet, shades of very good fastness to wet treatments and light.

EXAMPLE 3

When the 2 parts of phenol in Example 1 are replaced by 2.8 parts of β-naphthol, a dyestuff is obtained which dyes polyamide fibers in blue-black shades of very good fastness properties.

EXAMPLE 4

The solution of diazotized aminomonoazo dyestuff prepared as in Example 1 is added at 0°–5° C to a solution of 4.4 parts of N-phenyl-α-naphthylamine in 200 parts of glacial acetic acid, the resulting suspension stirred 18 hours at 0°–5° C and the precipitated dyestuff collected and washed acid-free with water. The resulting dye is dissolved in 400 parts water at pH 8 using sodium hydroxide solution, reprecipitated by addition of sodium chloride, collected and dried.

The product dyes polyamide fibres in reddish-navy shades of excellent fastness properties.

Replacement of N-phenyl-α-naphthylamine in the above Example by the appropriate amounts of N-ethyl, N-(4-methylphenyl)- or N-(4-methoxyphenol)-α-naphthylamine results in slightly greener, mid-navy shades of similar fastness properties.

EXAMPLE 5

When the solution of N-phenyl-α-naphthylamine in glacial acetic acid in Example 4 is replaced by a solution of 6 parts of N-phenyl-1-naphthylamine-8-sulphonic acid in 200 parts of water, the resulting dyestuff dyes polyamide fibres in greenish-blue shades of very good fastness properties.

EXAMPLE 6

When the diphenylamine diazo component in Example 4 is replaced by 6.2 parts of 2'-nitro-4-aminodiphenylamine-4'-sulphonic acid, the resulting dyestuff dyes polyamide fibres in reddish-navy shades of excellent fastness properties.

Further examples of dyes of the invention are prepared by diazotizing the aminodiphenylamines or alkyl-p-phenylenediamine listed in the second column below and coupling with 1-naphthylamine-6-sulphonic acid or 1-naphthylamine-7-sulphonic acid or a mixture of the two, rediazotizing the resulting amino-monoazo compound and coupling onto the coupling component listed in the third column. When applied to nylon under neutral or slightly acidic conditions the shades listed in the fourth column are obtained having good fastness to washing and light.

| Example | Aminodiphenylamine or alkyl-p-phenylene diamine | Coupling Component | Shade |
| --- | --- | --- | --- |
| 7 | 4-aminodiphenylamine-2-sulphonic acid | N-(2-methylphenyl)-α-naphthylamine | Navy-blue |
| 8 | " | N-(2-methoxyphenyl)-α-naphthylamine | " |
| 9 | " | N-ethyl-α-naphthylamine | " |
| 10 | " | N-β-hydroxyethyl-α-naphthylamine | " |
| 11 | " | N-β-sulphatoethyl-α-naphthylamine | " |
| 12 | 4-aminodiphenylamine | N-phenyl-α-naphthylamine-8-sulphonic acid | " |
| 13 | 2-nitro-4'-aminodiphenylamine-4-sulphonic acid | N-ethyl-α-naphthylamine | Black |
| 14 | " | N-phenyl-α-naphthylamine-8-sulphonic acid | " |
| 15 | 2-nitro-4'-aminodiphenylamine-3',4-disulphonic acid | N-phenyl-α-naphthylamine | " |
| 16 | 4-nitro-4'-aminodiphenylamine-2-sulphonic acid | " | " |
| 17 | " | N-ethyl-α-naphthylamine | " |
| 18 | " | N-phenyl-α-naphthylamine-8-sulphonic acid | " |
| 19 | 4'-methyl-4-aminodiphenylamine-2-sulphonic acid | N-phenyl-α-naphthylamine | Navy-blue |
| 20 | 4'-methoxy-4-aminodiphenylamine-2-sulphonic acid | " | " |
| 21 | 4-N-butyl-p-phenylenediamine-3-sulphonic acid | N-(4-methoxyphenyl)-α-naphthylamine | " |
| 22 | 4-N-β-hydroxyethyl-p-phenylene diamine-2-sulphonic acid | " | " |
| 23 | 4-N-β-hydroxyethyl-p-phenylene diamine-3-sulphonic acid | N-phenyl-α-naphthylamine-8-sulphonic acid | " |
| 24 | 4-N,N-diethyl-p-phenylene diamine-3-sulphonic acid | N-(4-methoxyphenyl)-α-naphthylamine | " |
| 25 | 4-aminodiphenylamine-2-sulphonic acid | 2-naphthol-6-sulphonic acid | Blue-black |
| 26 | " | p-cresol | Bluish-red |
| 27 | 2-nitro-4'-aminodiphenylamine-4-sulphonic acid | N-benzyl-N-ethyl-m-toluidine | Reddish-navy |
| 28 | " | 5-acetylamino-2-methoxy-N-ethylaniline | Navy-blue |
| 29 | " | 5-acetylamino-N,N-diethyl aniline | Reddish-navy |

| Example | Aminodiphenylamine or alkyl-p-phenylene diamine | Coupling Component | Shade |
|---|---|---|---|
| 30 | 4-aminodiphenylamine-2-sulphonic acid | 5-acetylamino-2-methoxy-N-benzylethylaniline | Navy-blue |
| 31 | '' | 5-acetylamino-2-methoxy-N-ethylaniline | '' |
| 32 | '' | N-(4-hydroxyphenyl)-α-naphthylamine | '' |

We claim:

1. A water-soluble disazo dye which, in the form of the free acid, has the formula

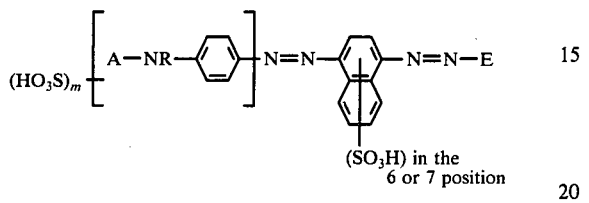

wherein

A represents lower alkyl, hydroxy lower alkyl, phenyl or phenyl substituted by nitro, lower alkyl or lower alkoxy, R represents hydrogen, or lower alkyl when A is lower alkyl, $m$ has a value of 0, 1 or 2 and
E represents

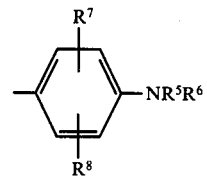

wherein $R^5$ represents hydrogen, lower alkyl, hydroxy lower alkyl or benzyl, $R^6$ represents lower alkyl or hydroxy lower alkyl and $R^7$ and $R^8$ each independently represent hydrogen, lower alkyl, lower alkoxy or acylamino.

2. The water-soluble disazo dye of claim 1 which has the formula

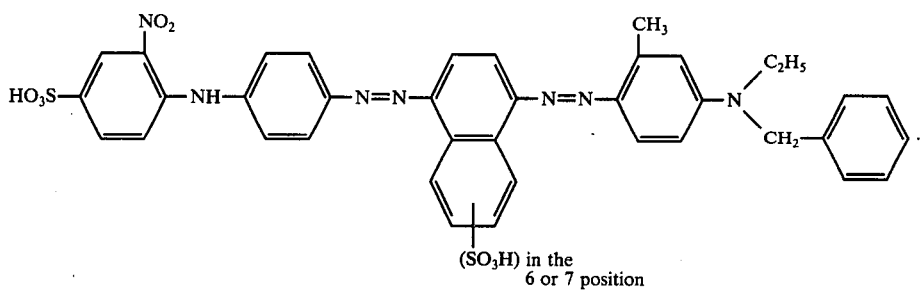

3. The water-soluble disazo dye of claim 1 which has the formula:

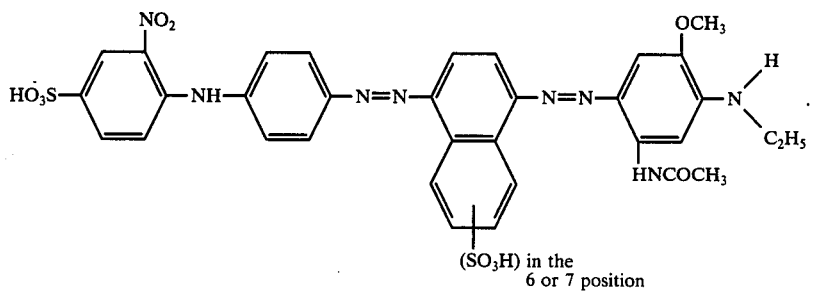

4. The water-soluble disazo dye of claim 1 which has the formula:

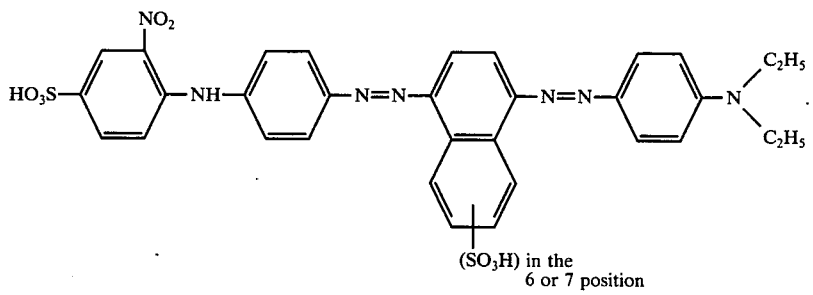

5. The water-soluble disazo dye of claim 1 which has the formula:

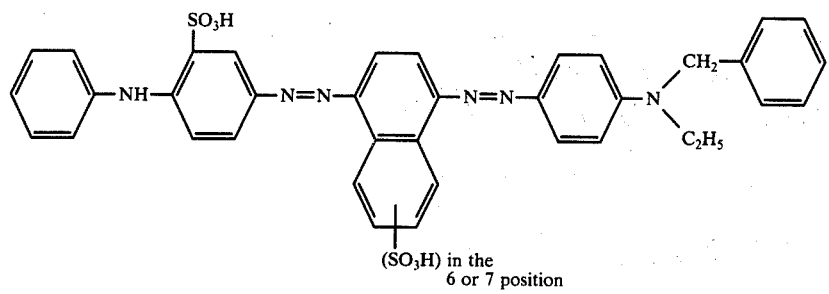

6. A water-soluble disazo dye which, in the form of the free acid, has the formula

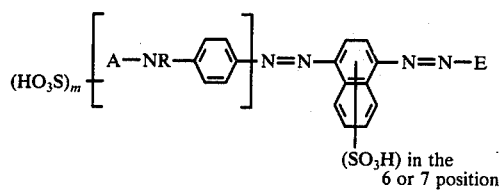

wherein

A represents lower alkyl, hydroxy lower alkyl, phenyl or phenyl substituted by nitro, lower alkyl or lower alkoxy, R represents hydrogen, or lower alkyl when A is lower alkyl, m has a value of 0, 1 or 2 and E represents

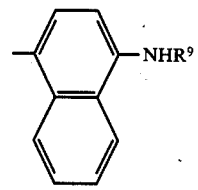

wherein $R^9$ represents lower alkyl, hydroxy lower alkyl, sulphato lower alkyl, phenyl or phenyl substituted by lower alkyl, lower alkoxy or hydroxy.

7. The water-soluble disazo dye of claim 6 which has the formula:

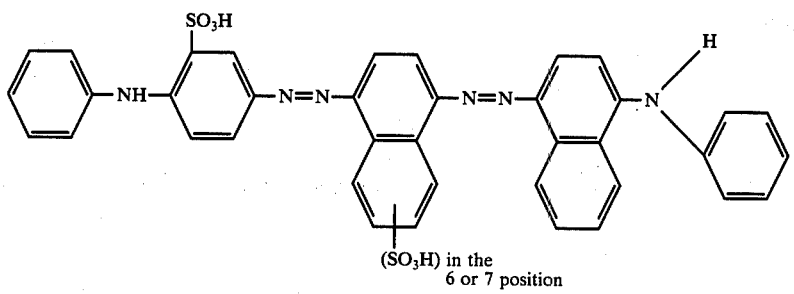

8. The water-soluble disazo dye of claim 6 which has the formula:

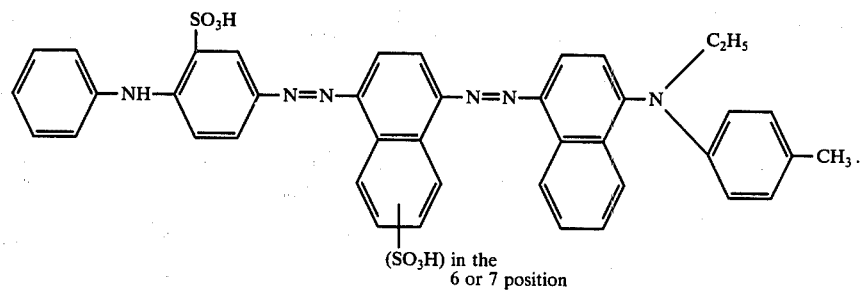

9. The water-soluble disazo dye of claim 6 which has the formula:

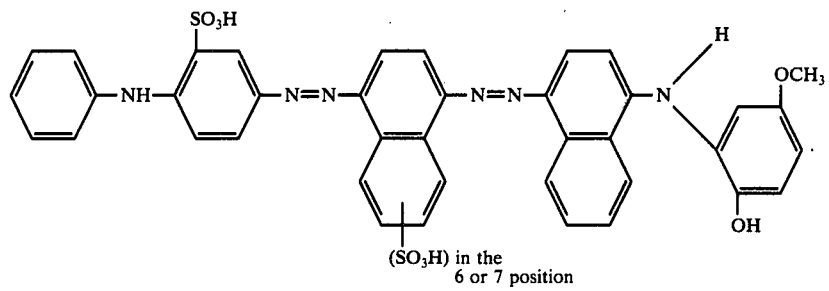
10. The water-soluble disazo dye of claim 6 which has the formula:
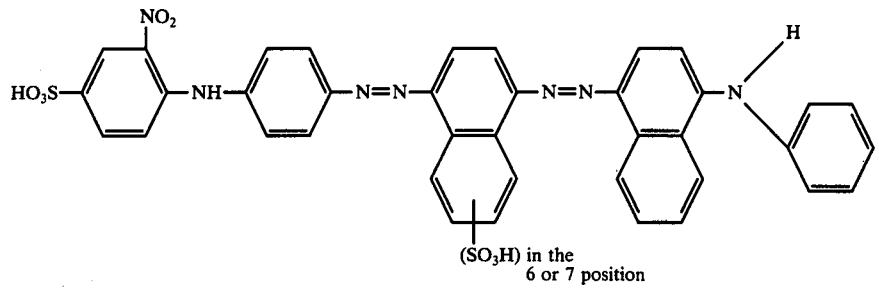
11. The water-soluble disazo dye of claim 6 which has the formula:
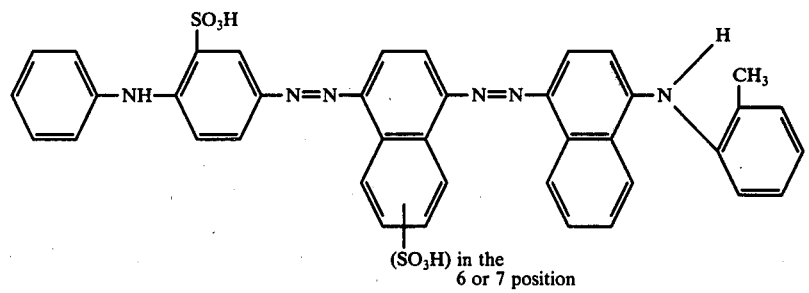
12. The water-soluble disazo dye of claim 6 which has the formula:
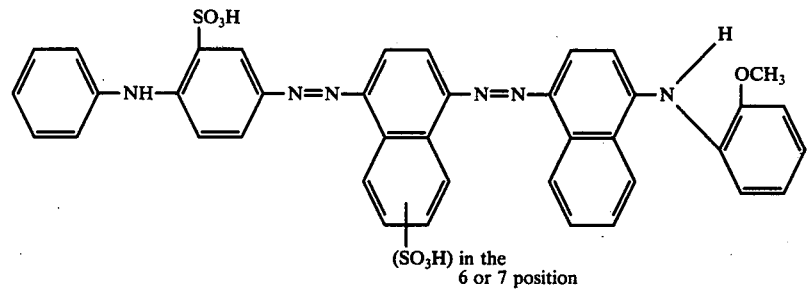
13. The water-soluble disazo dye of claim 6 which has the formula:
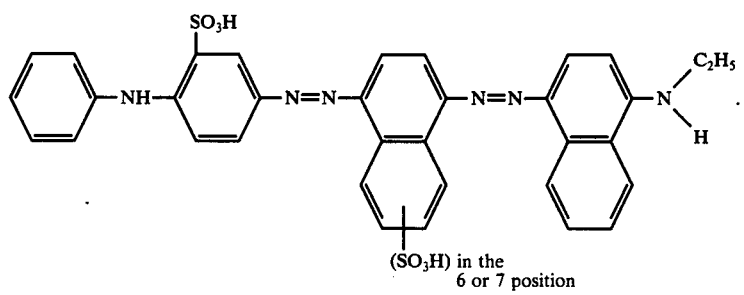

14. The water-soluble disazo dye of claim 6 which has the formula:
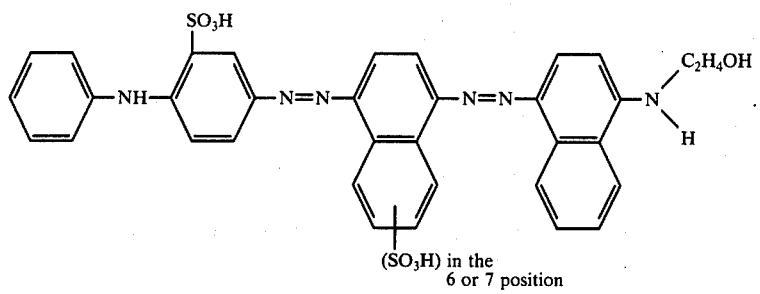
15. The water-soluble disazo dye of claim 6 which has the formula:
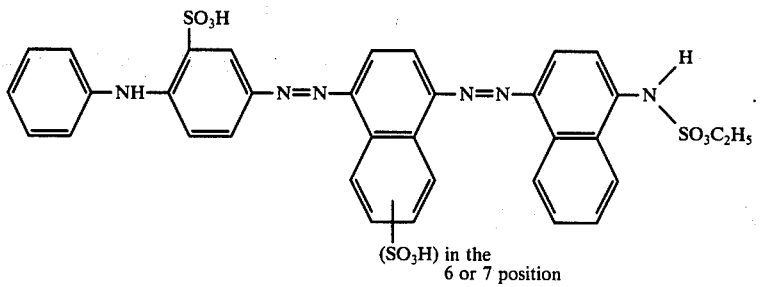
16. The water-soluble disazo dye of claim 6 which has the formula:
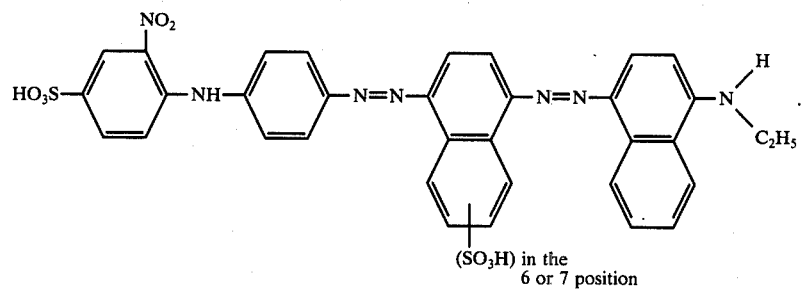
17. The water-soluble disazo dye of claim 6 which has the formula:
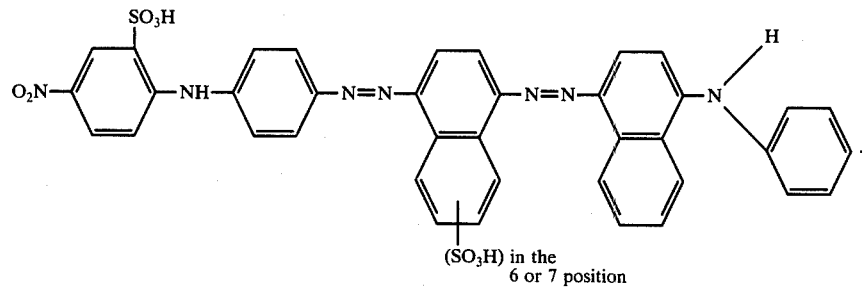
18. The water-soluble disazo dye of claim 6 which has the formula:

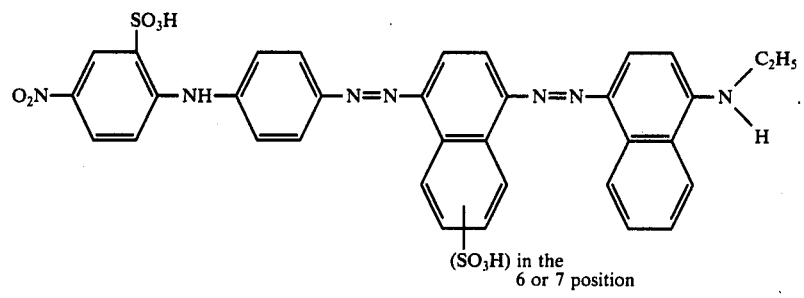
19. The water-soluble disazo dye of claim 6 which has the formula:
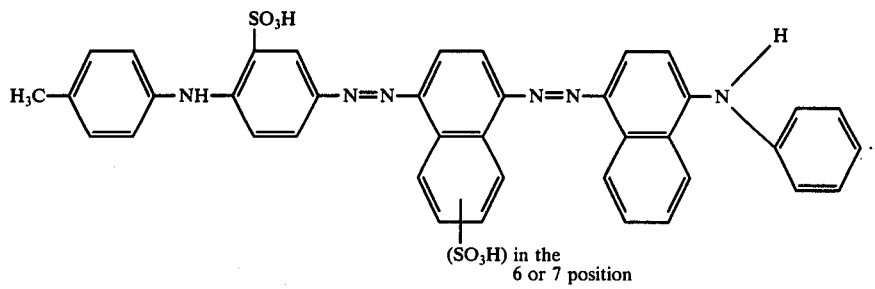
20. The water-soluble disazo dye of claim 6 which has the formula:
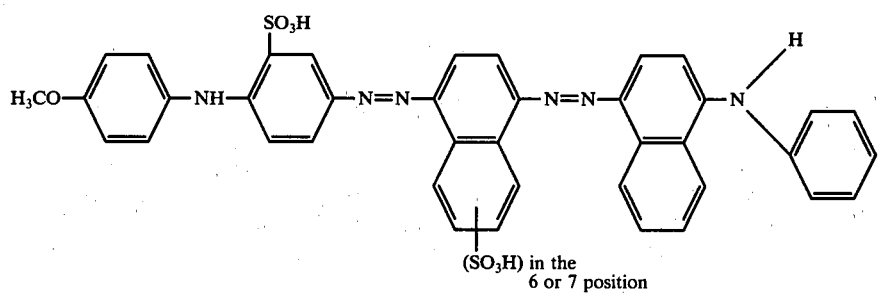
21. The water-soluble disazo dye of claim 6 which has the formula:
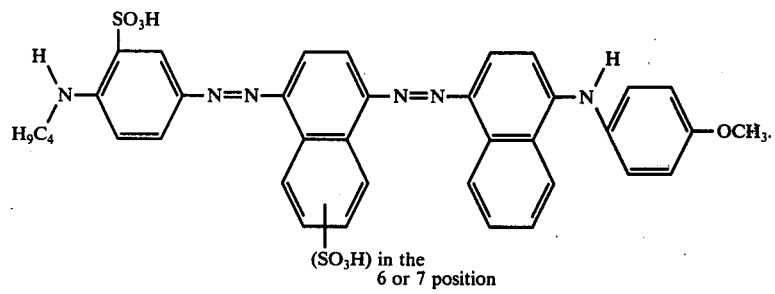
22. The water-soluble disazo dye of claim 6 which has the formula:
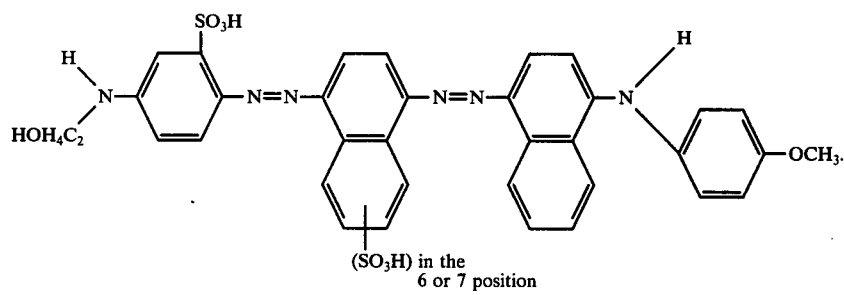

23. The water-soluble disazo dye of claim 6 which has the formula:
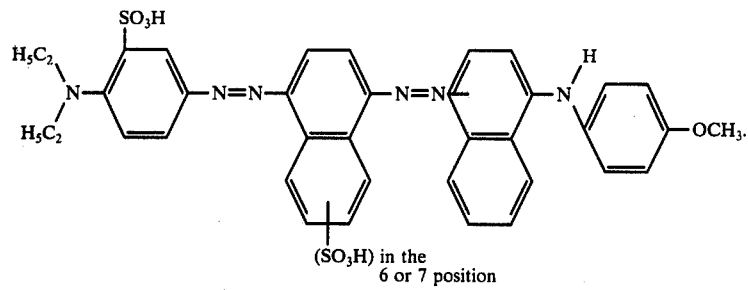
24. The water-soluble disazo dye of claim 6 which has the formula:
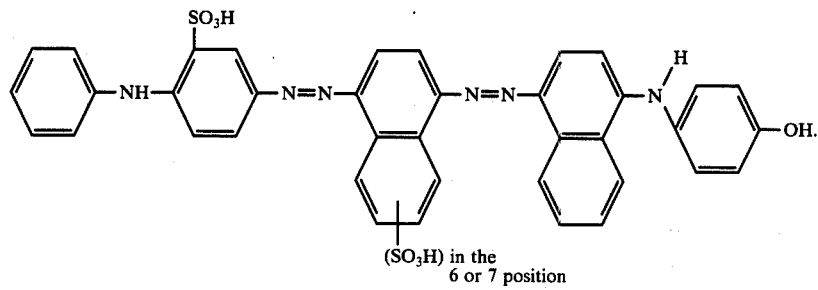
* * * * *